(12) United States Patent
Spaulding et al.

(10) Patent No.: US 6,243,133 B1
(45) Date of Patent: Jun. 5, 2001

(54) METHOD FOR AUTOMATIC SCENE BALANCE OF DIGITAL IMAGES

(75) Inventors: Kevin E. Spaulding, Spencerport; Edward B. Gindele, Rochester; James R. Niederbaumer, Webster, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/813,257

(22) Filed: Mar. 7, 1997

(51) Int. Cl.[7] ...................................................... H04N 9/73
(52) U.S. Cl. ........................ 348/223; 348/260; 348/650; 358/516
(58) Field of Search ..................................... 348/223, 221, 348/222, 225, 229, 362, 260, 264, 655, 657, 658, 644, 645, 647, 648, 650, 254, 256, 266; 358/518, 520, 516; 382/167, 284

(56) References Cited

U.S. PATENT DOCUMENTS

| | | |
|---|---|---|
| 4,101,217 | 7/1978 | Fergg et al. . |
| 4,679,074 * | 7/1987 | Sugiura et al. .................... 358/523 |
| 4,707,119 | 11/1987 | Terashita . |
| 4,945,406 * | 7/1990 | Cok .................................. 359/516 |
| 4,984,013 | 1/1991 | Terashita . |
| 5,016,043 | 5/1991 | Kraft et al. . |
| 5,130,935 * | 7/1992 | Takiguchi ........................ 382/167 |
| 5,255,093 * | 10/1993 | Topper et al. ................... 358/164 |
| 5,475,493 * | 12/1995 | Yamana ........................... 356/404 |
| 5,667,944 * | 9/1997 | Reem et al. ..................... 430/359 |
| 5,668,596 * | 9/1997 | Vogel ............................... 348/222 |
| 5,689,350 * | 11/1997 | Rolleston ........................ 358/518 |
| 5,699,451 * | 12/1997 | Birgmeir et al. ............... 382/167 |
| 5,786,823 * | 7/1998 | Madden et al. ................. 345/431 |
| 5,805,213 * | 9/1998 | Spaulding et al. .............. 348/223 |
| 5,822,453 * | 10/1998 | Lee et al. ........................ 382/169 |
| 5,907,415 * | 5/1999 | Yabe ............................... 358/518 |
| 5,909,291 * | 6/1999 | Myers et al. .................... 358/523 |

OTHER PUBLICATIONS

"Automatic Color Printing Techniques," Image Technology, Apr./May 1969, pp. 39–43.

"Tone Correction Apparatus for Color Analyzers," Eastman Kodak Research Disclosure, Nov. 1974, pp. 24–26.

\* cited by examiner

Primary Examiner—Wendy R. Garber
Assistant Examiner—Aung S. Moe
(74) Attorney, Agent, or Firm—Raymond L. Owens

(57) ABSTRACT

A scene balance correction method for a digital imaging device, including the steps of determining a low-resolution image from an input image in an input color space; applying a color transformation to convert the low-resolution image to a standard color space to form a standard color space low-resolution image; analyzing the standard color space low-resolution image to determine a set of standard color space scene balance correction factors; determining a set of corresponding input color space scene balance correction factors from the standard color space scene balance correction factors using the color transformation; and applying the corresponding input color space scene balance correction factors to the input image to form a corrected input image.

22 Claims, 6 Drawing Sheets

METHOD FOR AUTOMATIC SCENE BALANCE OF DIGITAL IMAGES

FIELD OF THE INVENTION

This invention pertains to the field of digital imaging, and more particularly to the field of exposure and white balance correction of digital images.

BACKGROUND OF THE INVENTION

Digital cameras, and other digital imaging devices, are becoming increasingly common both in the field of still photography, as well as in the field of motion imaging as is evidenced by the proliferation of digital cameras and video recorders. Digital imaging has the advantage over its counterparts, which utilize conventional media such as silver halide film, that the results are instantly available for viewing, editing, printing, and other forms of utilization.

Color digital imaging devices generally utilize an array of color sensors to capture the digital image information. The sensors typically have spectral sensitivities that correspond roughly to the red, green and blue portions of the visible spectrum. Alternatively, sensors with other spectral sensitivities such as cyan, magenta and yellow, or cyan, magenta, yellow and green have also been used. Typically, the exposure values captured by the color sensors are integerized to form quantized color values (code values) and stored in memory for later processing. The later processing blocks typically include color correction, as well as a variety of spatial processing blocks such as sharpening and/or noise removal.

Digital imaging devices are typically designed so that a nominal gray patch in the subject area of the image should be encoded with specified code values. For digital cameras, some type of exposure meter is typically used to determine a lens aperture and exposure time setting that is appropriate for the level of scene illumination. When an electronic flash is used, the flash exposure level is also typically controlled using some form of exposure meter. Other types of digital imaging devices may utilize other forms of exposure control.

Exposure errors can cause the nominal gray patch to come out at code values that are lower or higher than expected. Typical causes of exposure errors are scenes that are dominated by dark or light objects, and scenes where the subject and the background have significantly different exposure levels. For example, back-lit scenes where the background is brighter than the subject, and flash-lit scenes where the background is at a much larger distance than the subject. In some cases, such as a digital scanner designed to scan photographic prints or negatives, the exposure errors may be inherent in the "scene" itself. For example, if a slide scanner may be used to scan an overexposed slide.

In addition to exposure level errors, color balance errors can also be introduced by variations in the spectral content of the scene illumination. Typically, digital imaging devices are designed so that equal color signals will be generated for neutral scene objects. Color balance errors cause the relative proportions of the color signals for a neutral scene object to deviate from the expected value. For example, if a digital camera is calibrated so that equal red, green, and blue color signals are obtained when a neutral object is photographed with typical daylight illumination, non-equal color signals will generally result when the neutral object is photographed under tungsten illumination.

These exposure level and color balance problems are analogous to those that occur in traditional silver halide photography. In that case, "scene balance algorithms" have been developed to analyze a photographic negative and adjust a set of color filter values and/or exposure times in an optical printing system to compensate for the exposure and color balance errors. (For example, see "Automatic Color Printing Techniques," Image Technology, April/May 1969, pp. 39–43; "Tone Correction Apparatus for Color Analyzers," Eastman Kodak Research Disclosure, Nov. 1974, pp. 24–26; U.S. Pat. No. 4,101,217 assigned to AGFA-Gevaert A. G.; U.S. Pat. No. 4,707,119 and 4,984,013 assigned to Fuji Photo Film Co., Ltd.; and U.S. Pat. No. 5,016,043 assigned to Gretag Systems.)

Scene balance algorithms typically work by analyzing the distribution of overall exposure levels and relative color values in an image to determine the appropriate level of exposure and color balance compensation that is needed. Frequently, these algorithms work by first computing a low-resolution version of the image and then analyzing that image. The low-resolution image is sometimes referred to as a "paxelized" image. The term "paxel" as used throughout this specification shall mean a color value determined by averaging the color values for a group of pixels.

Scene balance algorithms can also be used for digital imaging devices. In this case, the scene balance algorithms must typically be tuned to the color response characteristics of a particular digital imaging device. For example, different digital film scanners will have different sensor spectral sensitivities. Additionally, different film scanners may also use different code value vs. density quantization functions. Therefore, the distribution of code values associated with a particular image will be a function of the digital imaging device that is used to capture the image. Since most scene balance algorithms rely on an analysis of the distribution of the image code values to determine the appropriate corrections, this would necessitate developing different versions of the algorithm to work with different digital imaging devices.

A scenario where different versions of the scene balance algorithm are used for different digital imaging devices is shown in FIG. 1. In this case, an image is captured by two different digital imaging devices 10 and 11. Input color values generated by the first digital imaging device 10 are in a first device dependent color space and are shown as $R_1$, $G_1$ and $B_1$. Likewise, input color values generated by the second digital imaging device 11 are in a second device dependent color space and are shown as $R_2$, $G_2$ and $B_2$. A first scene balance algorithm 12 optimized for images in the first color space is shown operating on the first set of input color values to produce balanced color values $R_{1B}$, $G_{1B}$ and $B_{1B}$. A second scene balance algorithm 13 optimized for images in the second color space is shown operating on the second set of input color values to produce balanced color values $R_{2B}$, $G_{2B}$ and $B_{2B}$. Following the scene balance blocks, it is typically necessary to perform a color correction block in order to produce color signals that are appropriate for display on a particular output device 16, or for storage in a standard image format. Since the color spaces associated with the digital imaging devices are different, it is also necessary to use different color correction transformations for each digital imaging device. These color correction transformations are shown as 14 and 15 for the first and second imaging devices, respectively. Applying the color correction transformations to the balanced color values produces output color values $R_O$, $G_O$ and $B_O$ that are appropriate for display with the output device 16.

Since developing many variations of the scene balance algorithm for different devices is quite time consuming, an alternate approach can be used which involves first transforming the digital image color values to a standard representation where a fixed scene balance algorithm can be employed. For example, in FIG. 2, the scene balance algorithm is applied following the color correction transformations. In this case, an image is captured by two different digital imaging devices 20 and 21. Input color values generated by the first digital imaging device 20 are in a first device dependent color space and are shown as $R_1$, $G_1$ and $B_1$. Likewise, input color values generated by the second digital imaging device 21 are in a second device dependent color space and are shown as $R_2$, $G_2$ and $B_2$. Color correction transformations 22 and 23 are applied to the color values for the first and second imaging devices to produce output color values $R_O$, $G_O$ and $B_O$ in an output color space that is appropriate for display with the output device 25. A scene balance algorithm 24 optimized for images in the output color space is shown operating on the output color values to produce balanced output color values $R_{OB}$, $G_{OB}$ and $B_{OB}$.

The arrangement shown in FIG. 2 has an advantage over that shown in FIG. 1 in that only a single scene balance algorithm needs to be developed and optimized. However, there is also an important disadvantage associated with this technique. Since the output device has a finite dynamic range and color gamut, a large amount of image information is generally lost in the process of applying the color correction transformations to the digital imaging device color values. In particular, digital imaging devices are typically designed so that the dynamic range associated with the input color values is large enough to encode image intensity values that are substantially higher than those that would be associated with an output device. This extra dynamic range can be as large as an extra factor of 2 or more. The color correction transformation will then apply a set of tone/color reproduction aims to compress the extra dynamic range and color gamut associated with the input color values into the displayable gamut of the output device. An important part of the color correction transformation is a tonescale function that relates the input intensity values to the output device intensity values. A typical tonescale curve 30 that can be used is shown in FIG. 3. The horizontal axis represents the logarithm base 10 of the input exposure value. A log exposure of 0.0 corresponds to the exposure obtained from objects in the image that have a reflectance of 1.0. The vertical axis represents the negative of the logarithm of the image intensity. This is analogous to the optical "density" of a photographic print. It can be seen that the input exposure values outside a range of −2.0 to 0.0 are compressed into small ranges of image intensities. As a result, much of the image information that was captured in this range is lost during the application of the color correction transformation. This loss of image information is particularly important if the scene balance algorithm determines that the image was overexposed. In the case, it is necessary to darken the image accordingly. However, much of the information that could be used to darken the image corresponds to that which was lost in the color correction transformation. Therefore, the correction introduced by the scene balance algorithm will be less optimal than that associated with the method of FIG. 1 where the images were corrected in the input color space.

A third configuration is shown in FIG. 4 that overcomes many of the disadvantages associated with the arrangement of FIG. 2. In this case, an image is captured by two different digital imaging devices 40 and 41. Input color values generated by the first digital imaging device 40 are in a first device dependent color space and are shown as $R_1$, $G_1$ and $B_1$. Likewise, input color values generated by the second digital imaging device 41 are in a second device dependent color space and are shown as $R_2$, $G_2$ and $B_2$. Color transformation blocks 42 and 43 are applied to the color values for the first and second imaging devices to produce standard color space values $R_S$, $G_S$ and $B_S$ in an standard color space. The standard color space being chosen so that the extended dynamic range and color gamut associated with the input color spaces can be encoded without significant loss of information. A scene balance algorithm 44 optimized for images in the standard color space is shown operating on the standard color space values to produce balanced standard color space values $R_{SB}$, $G_{SB}$ and $B_{SB}$. Since the standard color space values are not appropriate for display on an output device 46, a color correction transformation 45 is then used to compute output color values $R_O$, $G_O$ and $B_O$.

Although the method of FIG. 4 overcomes many of the limitations associated with FIGS. 1 and 2, there is also a disadvantage to this approach. It can be seen that two color transformation operations are now necessary to process the image. One color transformation to determine the standard color space values from the input color space values, and a second color transformation to determine the output color values from the balanced standard color space values. Therefore, the computation time and complexity associated with the color processing operations is increased significantly relative to the methods shown in FIGS. 1 and 2.

SUMMARY OF THE INVENTION

It is an object of the present invention to apply a scene balance algorithm to an image from a digital imaging device that overcomes the limitations of the prior art implementations without significantly increasing the computation time and complexity associated with the color processing operations.

This object is achieved by a scene balance correction method for a digital imaging device, including the blocks of determining a low-resolution image from an input image in an input color space, applying a color transformation to convert the low-resolution image to a standard color space to form a standard color space low-resolution image, and analyzing the standard color space low-resolution image to determine a set of standard color space scene balance correction factors. Additionally, a set of corresponding input color space scene balance correction factors are determined from the standard color space scene balance correction factors using the color transformation, and the input color space scene balance correction factors are applied to the input image to form a corrected input image.

Advantages

The method of the present invention has the advantage over other methods that apply a scene balance algorithm to digital image data in that a standard scene balance algorithm can be used independent of the input color space. It has the additional advantage that corrections introduced by the scene balance algorithm are applied to the image before other color transforms are applied that would result in a loss of dynamic range or color gamut. It has the additional advantage that only a single color correction transformation must be applied to a full-resolution version of the image data which results in improved processing efficiency.

DETAILED DESCRIPTION OF THE INVENTION

The present invention represents a method for applying a scene balance algorithm to an image from a digital imaging device. The scene balance algorithm is split into two phases. In the first phase, a low-resolution image in an input color space is converted to a standard color space and analyzed using a standard scene balance algorithm to determine a set of correction factors. In the second phase, a set of corresponding correction factors are determined that can be applied in the input color space. These corresponding correction factors are then used to correct the image in the input color space to form a balanced image. The balanced image can then be color-corrected as necessary to convert the input color space values to the color space values appropriate for a specified output device.

Figure 1:
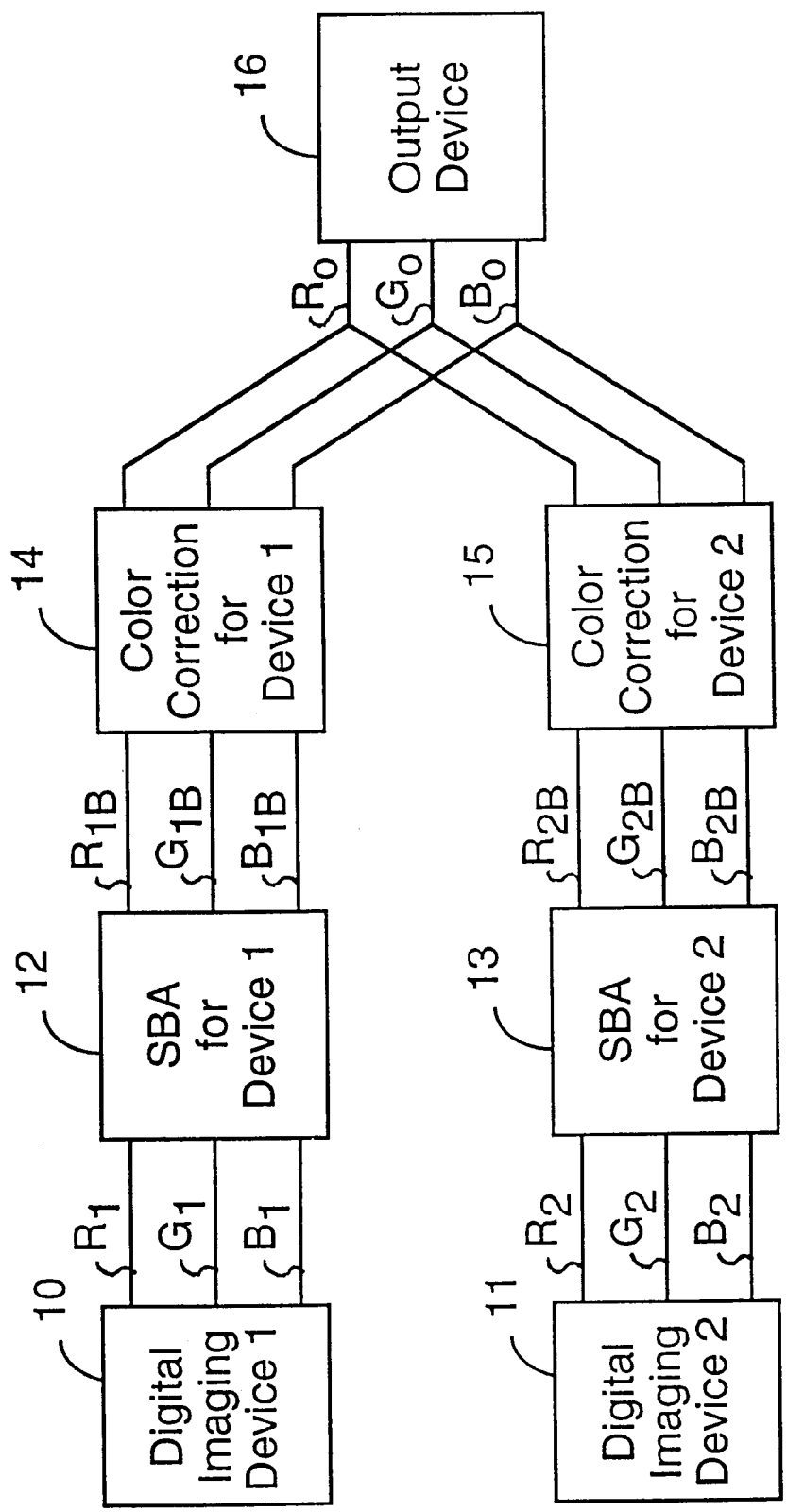
FIG. 1 depicts a prior art arrangement for applying a scene balance algorithm to digital images where different versions of the scene balance algorithm are used for different digital imaging devices.
Figure 2:
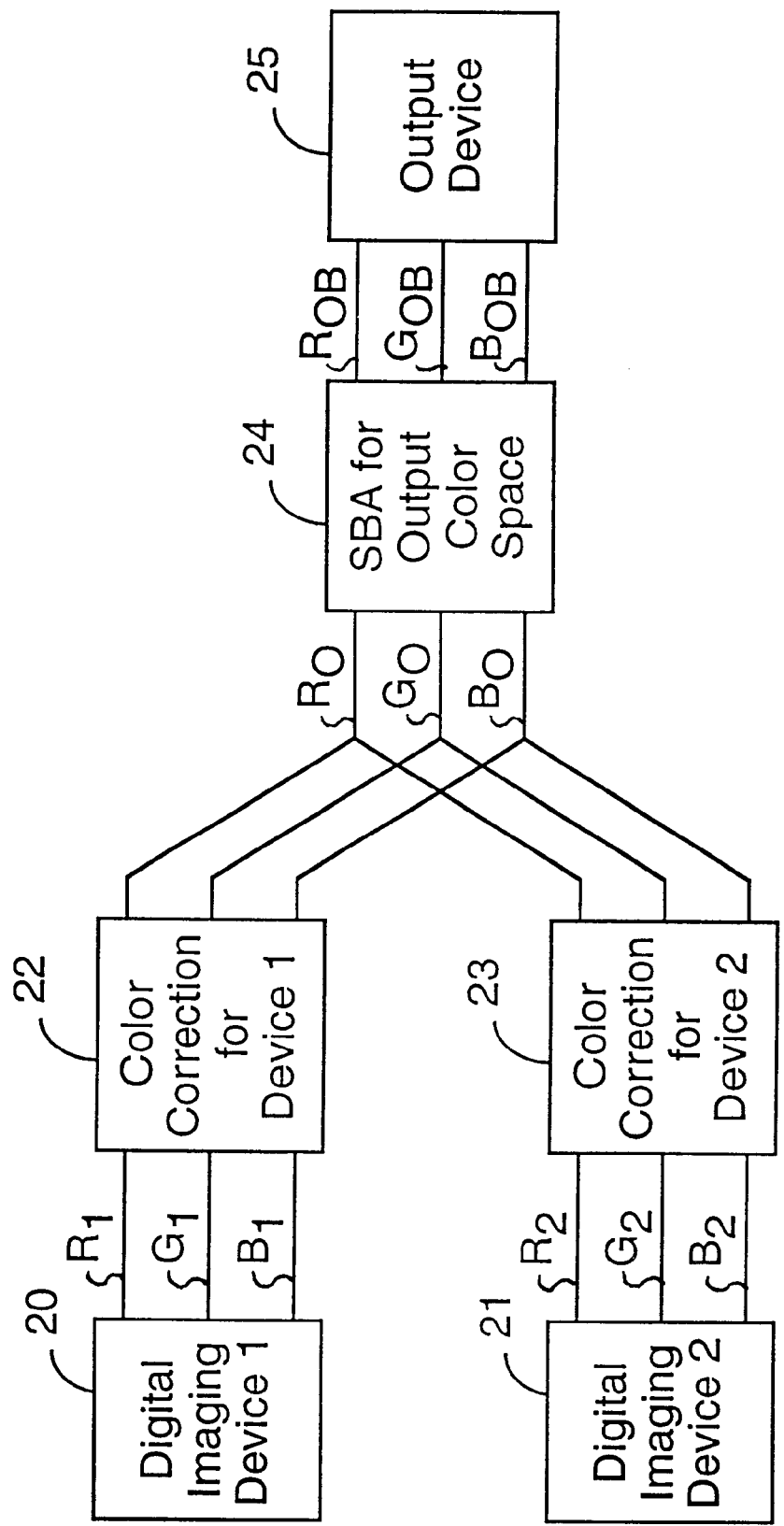
FIG. 2 depicts another prior art arrangement for applying a scene balance algorithm to digital images where images from different digital imaging devices are first converted to an output color space.
Figure 3:
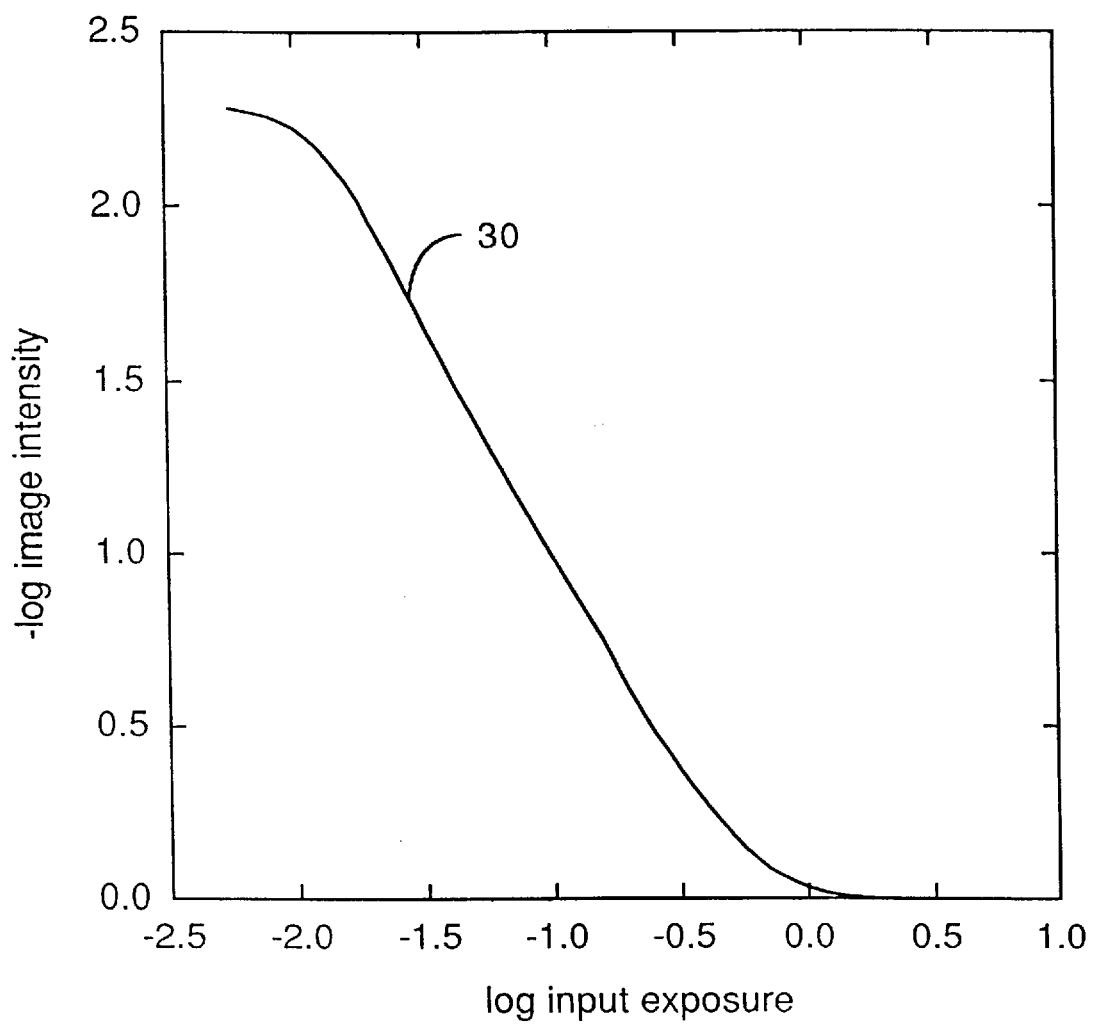
FIG. 3 is a graph which depicts tonescale function that is based on a plot of log image intensity vs. log scene exposure.
Figure 4:
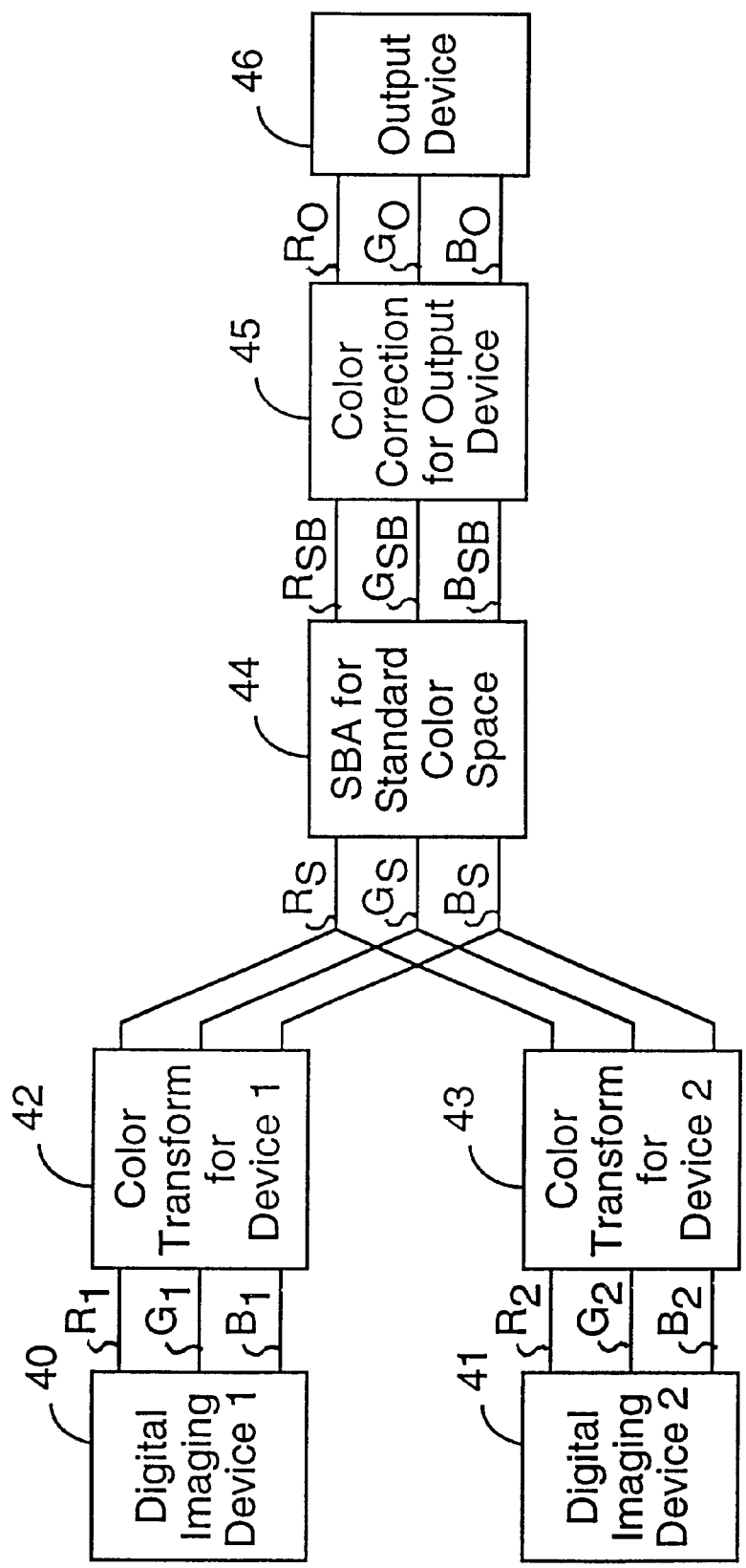
FIG. 4 is a still further prior art arrangement for applying a scene balance algorithm to digital images where images from different digital imaging devices are first converted to a standard color space.
Figure 5:
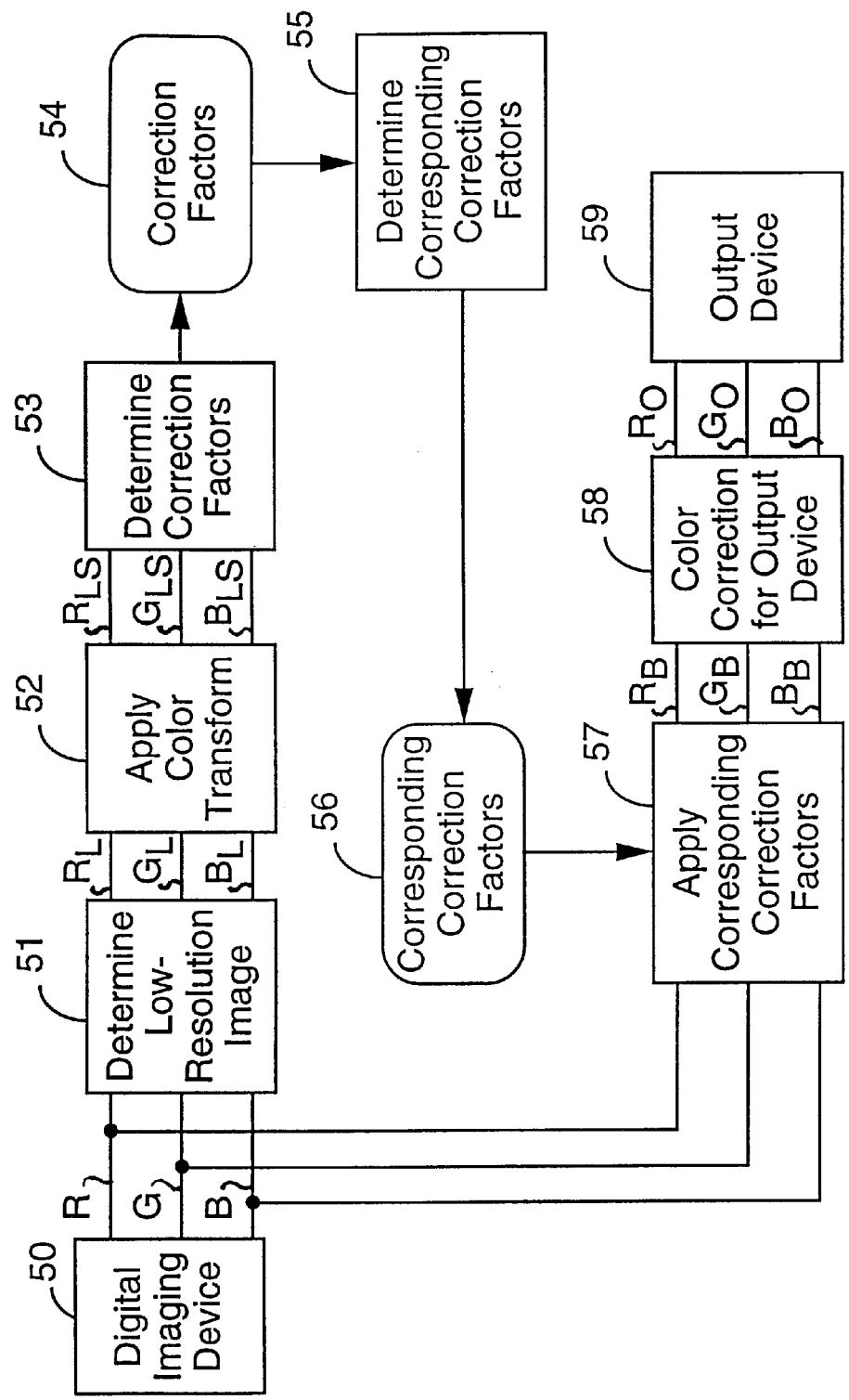
FIG. 5 is a block diagram illustrating the method of the present invention.

With reference to FIG. 5, the method of the present invention will now be described in more detail. An input digital image is captured by a digital imaging device 50. The digital imaging device can be a digital camera, a digital scanner, or any other digital image capture device. Input color values in an input color space are generated by the digital imaging device 50. For illustrative purposes a red-green-blue component color space will be assumed. Accordingly, the input color values are shown generically as R, G and B. However, it should be noted that the input color space is not limited to a red-green-blue component color space, but that other types of color spaces such as cyan-magenta-yellow can also be used. Generally, the input color values will represent device dependent color values, but in some cases the digital imaging device may be adapted to provide images in a device-independent color space such as CIE XYZ tristimulus values, or CIELAB. Next, a low-resolution image determining block is adapted to determine a low-resolution version of the image. The resulting color values are shown as $R_L$, $G_L$ and $B_L$, however it should be noted that these color values will still be encoded in the input color space. Next, a color transform application block 52 is used to convert the low-resolution image from the input color space to a standard color space. The resulting standard color values are shown as $R_{LS}$, $G_{LS}$ and $B_{LS}$. Next a correction factors determining block 53 is used to analyze the low-resolution image and determine a set of scene balance correction factors 54 characterizing the necessary scene balance corrections. The scene balance correction factors 54 are appropriate for correcting the image in the standard color space. A set of corresponding scene balance correction factors 56 are then determined using a corresponding correction factors determining block 55. The corresponding scene balance correction factors 56 are appropriate for correcting the image in the input color space using an apply corresponding correction factors block 57 to determine a balanced input image. The balanced input image color values are shown as $R_B$, $G_B$ and $B_B$. A color correction block 58 will generally be used to convert the balanced input image color values to output image values $R_O$, $G_O$ and $B_O$ appropriate for an output device 59. The output device may be a video display device, a printer, or even a specific output file format.

Figure 6:
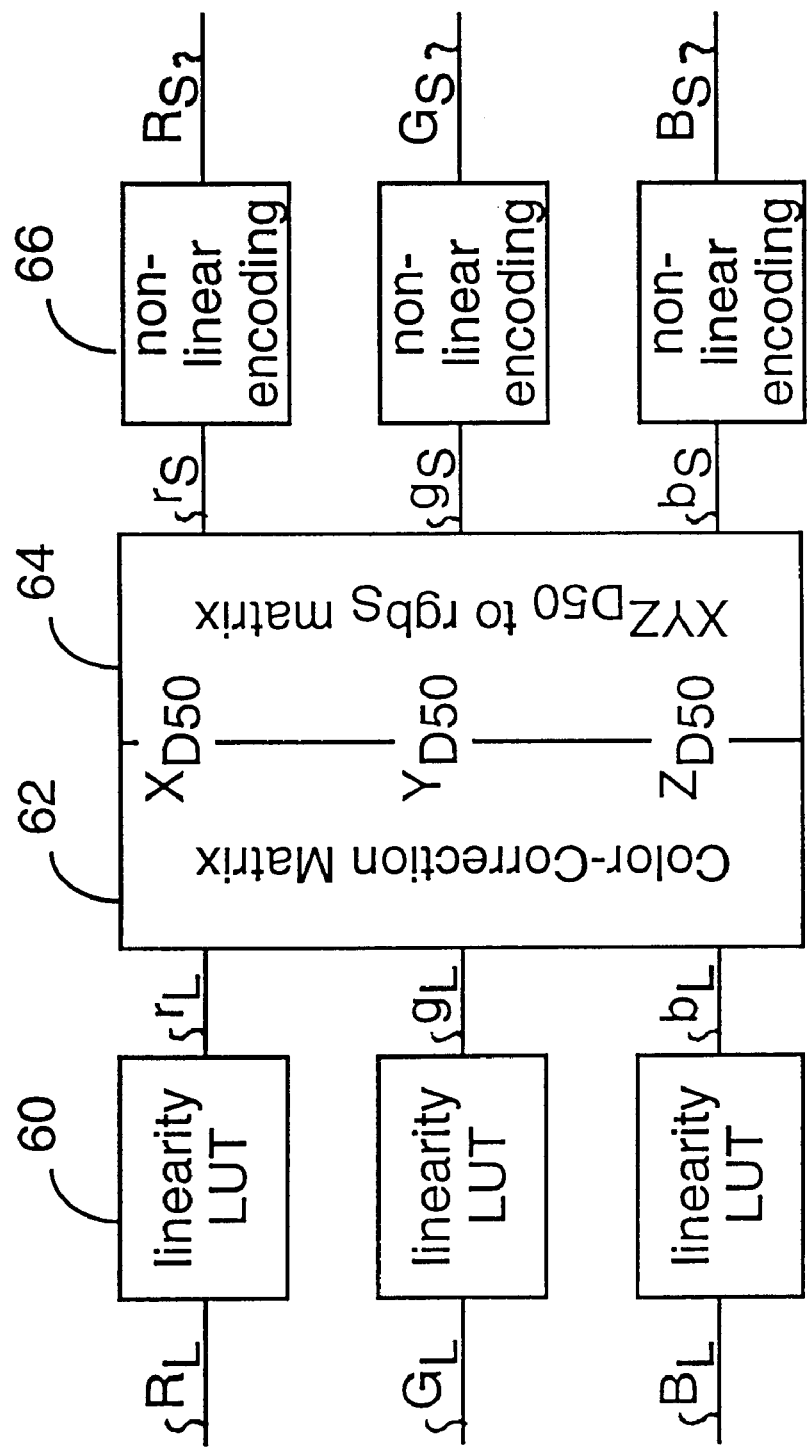
FIG. 6 is a diagram showing the implementation of the application of the transform block of FIG. 5.

Before discussing the details of FIGS. 5 and 6, as will be understood by those skilled in the art, the structure for performing the operations described can either be "hard-wired" or accomplished by a digital computer. The programs for the digital computer corresponding to the blocks can be provided on a storage medium which can be downloaded into the computer.

The computer readable storage medium may comprise, for example, magnetic storage media such as magnetic disc (such as a floppy disc) or magnetic tape; optical storage media such as optical disc, optical tape, or machine readable bar code; solid state electronic storage devices such as random access memory (RAM), or read only memory (ROM); or any other physical device or medium employed to store a computer program.

The blocks described in FIG. 5 will now be discussed in more detail. The low-resolution image determining block 51 processes the input image to determine a low-resolution version of the image. Generally this is accomplished by breaking the input image into a number of blocks corresponding to the number of picture elements in the low-resolution image. The input color values for all of input image pixels in each block are then averaged to determine a color value for the low-resolution picture element. Picture elements of the low-resolution image are sometimes referred to as "paxels." Likewise, the low-resolution image is sometimes referred to as a "paxelized image." The dimensions of the paxelized image are generally in the range of 10 to 100 rows and columns. However, a larger range of values may be useful in certain cases. In a preferred embodiment of the present invention, the dimensions of the low-resolution image are approximately 24 rows and 36 columns. In some cases, it may be advantageous to compute the paxelized image from only a subset of the input image pixels. For example, it may be desirable to ignore the regions near the edges of the image.

For many digital imaging devices, such as digital cameras, a color filter array is used in conjunction with a digital sensor. In these case, each pixel of the input image captured by the digital sensor will contain information about only one color channel of the image. For example, some of the pixels may be red pixels, while other pixels may be green or blue pixels. Generally, color filter array interpolation algorithms are used to estimate the missing color values for each pixel to determine an interpolated image. It should be noted that the low-resolution image determining block 51 can be performed on either the color filter array image directly, or on the interpolated image. If the color filter array image is used for this block, then only the pixels that are associated with a particular color channel are used to determine the corresponding color channel of the low-resolution image. In this case, an interpolated image must be computed sometime before the color correction block 58 is performed.

The color transform application block 52 is used to convert the low-resolution image from the input color space to a standard color space. The standard color space is generally chosen so as not to impose any substantial color gamut and/or dynamic range limitations to the digital image data. One such color space is an RGB color space defined with respect to a hypothetical additive color device having the following characteristics:

a) reference primaries defined by the CIE chromaticities given in Table 1;

b) equal amounts of the reference primaries produce a neutral with the chromaticity of D50;

c) the capability of producing a black with L*=0; and d) no cross-talk among the color channels (i.e., red output is affected only by red input, green output is affected only by green input, and blue output is affected only by blue input).

TABLE 1

Primaries for standard color space

| color | x | y |
| --- | --- | --- |
| Red | 0.8730 | 0.1440 |
| Green | 0.1750 | 0.9270 |
| Blue | 0.0850 | 0.0001 |
| White | 0.3457 | 0.3585 |

An example of a color transformation that can be used to convert the input color values to this standard color space is shown in FIG. 6. The input color space will generally be a non-linear color space to account for the fact that the human visual system responds nonlinearly. The first block is to apply a linearity LUT 60 that converts the non-linear input color values $R_L$, $G_L$ and $B_L$ to their equivalent linear input color space values $r_L$, $g_L$ and $b_L$.

For many types of digital imaging devices, a matrix can be used to model the color characteristics of the device with a reasonable degree of accuracy.

In this case, a color correction matrix 62 can be used to determine the approximate CIE XYZ tristimulus values as a function of the linear input color space values. An XYZ to rgbs matrix 64 can then be used to determine the corresponding linear standard color space values as a function of the CIE tristimulus values. For the primaries given in Table 1, it can be shown that this matrix is given by $$\begin{bmatrix} r_S \\ g_S \\ b_S \end{bmatrix} = \begin{bmatrix} 1.4521 & -0.2890 & -0.1349 \\ -0.1929 & 1.1713 & 0.0178 \\ 0.0015 & 0.1173 & 1.0682 \end{bmatrix} \begin{bmatrix} X_{D50} \\ Y_{D50} \\ Z_{D50} \end{bmatrix} \quad (1)$$

Generally, the color correction matrix 62 and the XYZ to $rgb_s$ matrix 64 can be combined into a single composite color transformation matrix for implementation purposes.

It is frequently desirable to encode the standard color space values using a nonlinear encoding 66. One typical nonlinear encoding is based upon Rec. ITU-R BT.709. (This recommendation was formerly known as CCIR 709.) This same nonlinearity is also used in the PhotoYCC Color Space encoding implemented in the Kodak PhotoCD System. The functional form of the nonlinearity is given by:

$$R_S = \begin{cases} 0; & r_S < 0.0 \\ \left(\frac{I_{max}}{V_{clip}}\right) 4.5 \, r_S; & 0.0 \leq r_S \leq 0.018 \\ \left(\frac{I_{max}}{V_{clip}}\right)(1.099 \, r_S^{0.45} - 0.099); & 0.018 < r_S < E_{clip} \\ I_{max}; & r_S > E_{clip} \end{cases} \quad (2)$$

where $I_{max}$ is the maximum integer value used for the nonlinear encoding, $E_{clip}$ is the exposure level that is mapped to $I_{max}$, and $$V_{clip}=1.099 \, E_{clip}^{0.45}-0.099 \quad (3)$$

For one 8-bit embodiment of the present invention $I_{max}$ is 255 and $E_{clip}$ is 2.00.

Although FIG. 6 shows an example of one type of color transformation that can be used to compute standard color space values as a function of the input color values, it should be recognized that many other types of color transformations could also be used. For example, more complex models of the digital imaging device could be used that involve higher-order polynomial models, or multiple sets of look-up tables and matrices. Alternatively, the color transformation could be implemented using a multi-dimensional look-up table with tri-linear interpolation.

In some cases, it is desirable to use a standard color space having a luminance channel and two color-difference channels. Examples of such spaces include PhotoYCC and YCrCb. One particular color space of this type involves calculating three channels using the following equations:

$$N=(R_{Log}+G_{Log}+B_{Log})/3$$

$$GM=(2G_{Log}-R_{Log}-B_{Log})/4$$

$$ILL=(B_{Log}-R_{Log})/2 \quad (4)$$

where $R_{Log}$, $G_{Log}$, and $B_{Log}$ are the logarithms of the linear standard color space values. In this case, N is the luminance channel, GM is a color difference channel in a green-magenta direction, and ILL is a color difference channel that is roughly lined up with the direction in which typical scene illuminants vary.

The next operation is to use a correction factors determining block 53 to analyze the low-resolution image and determine a set of scene balance correction factors 54 characterizing the necessary scene balance corrections. This represents the heart of the scene balance algorithm. Many different types of scene balance algorithms have been used in the past for optical printers. In the simplest case, the assumption is made that the "world averages to gray." In this case, it is possible to estimate a gray balance point for an image by averaging the standard color space values for all of the paxels in the image. The gray balance point represents the color value in the standard color space that should be mapped to a reference gray in the corrected image. Typically the reference gray corresponds to a neutral object in the scene having a reflectance of 18%. Once the gray balance point has been estimated, a set of scene balance correction factors 54 can be determined by calculating the corrections that would be necessary to map the gray balance point to the reference gray point.

Many more sophisticated types of scene balance algorithms have been developed. Some forms weight the color values from different regions of the image according their location within the frame, or the amount of spatial activity. Other forms weight the color values from the saturated portions of the color space less than the color values near the neutral axis. Still others incorporate more sophisticated statistical models, or "fuzzy logic." A description of the details of these methods is beyond the scope of the current discussion. The reader is referred to the prior art referred to above for examples of a number of different scene balance algorithm variations.

In the cases of interest, the end result of running the scene balance algorithm on the low-resolution image data is the determination of a set of scene balance correction factors 54. In some cases, the scene balance correction factors comprise a set of gain factors $f_R$, $f_G$ and $f_B$, for each channel of a standard color space image. In other cases, the scene balance correction factors may comprise a set of shifts that should be applied to a luminance/color-difference representation of a log-space image. The luminance shift represents a form of an overall intensity level correction, and the color-difference shifts represent a form of color balance correction.

Next, a set of corresponding scene balance correction factors 56 are determined using a corresponding correction factors determining block 55. The corresponding scene balance correction factors 56 are appropriate for correcting the image in the input color space using an apply corresponding correction factors block 57 to produce a balanced input image. In one embodiment of the present invention, the corresponding correction factors determining block 55 is accomplished by applying an inverse color transform to the gray balance point to determine a corresponding input color space gray balance point. In this case, the inverse color transform is an inverse of the color transform applied in the color transform application block 52. An appropriate set of correction factors can then be determined that will transform the corresponding input color space gray balance point to an appropriate input color space reference gray point.

Consider the case where the correction factors determining block 53 provides a set of gain factors $f_R$, $f_G$ and $f_B$, for each channel of the linear standard color space image. If a matrix based color transform like that shown in FIG. 6 is used for the color transform application block 52, it can be shown that a corresponding set of gain factors $f_{RI}$, $f_{GI}$ and $f_{BI}$, for each channel of the linear input color space image can be computed using the following equation $$\begin{bmatrix} 1/f_{RI} \\ 1/f_{GI} \\ 1/f_{BI} \end{bmatrix} = \overline{M}_{CT}^{-1} \begin{bmatrix} 1/f_R \\ 1/f_G \\ 1/f_B \end{bmatrix} \quad (5)$$

where $\overline{M}_{CT}$ is the composite color transformation matrix.

Generally, the input color values of the input digital image that is processed by the apply corresponding correction factors block 57 are encoded using some sort of nonlinear mapping. As a result, the gain factors $f_{RI}$, $f_{GI}$ and $f_{BI}$, for each channel of the linear input color space image can not be applied directly to the nonlinear input color values. Instead, the corresponding linear input color space values must first be determined using a linearity LUT 60 as was discussed above. The gain factors can then be applied to the linear input color space values to determine balanced linear input color space values. After the gain factors have been applied, it is usually desirable to return to a nonlinear encoding of the input color space values. Since these three blocks are all one-dimensional function, they can be combined into a single set of one-dimensional look-up tables that can be applied directly to the input color values.

In some cases it may be desirable to use more complex correction functions than the simple linear gain factors that were just described. For example, non-linear gain functions could be used to vary the gain as a function of the input level. This approach can be used to avoid artifacts at the ends of the tonescale. In other cases, three-dimensional correction functions can be used to implement the corresponding correction factors. For example, the corresponding correction factors could be computed in terms of color shifts in a luminance/color-difference representation of the input image. The input image could then be converted to that space, and the color shifts could then be applied. It will be obvious to one skilled in the art that many other types of correction functions could also be used to implement the method of the present invention.

Finally, the color correction block 58 is used to convert the balanced input image color values to output image values $R_O$, $G_O$ and $B_O$ appropriate for an output device 59. The output device may be a video display device, a printer, or even a specific output file format. Depending on the color reproduction aims, and the complexity of the image processor used to apply the color correction block, a variety of forms of color correction transformations may be used. The simplest types of color correction transformations typically involve a color correction matrix applied to the linear input color space values followed by a nonlinear encoding function. In other cases three-dimensional look-up tables, or color management transformations could be used.

The invention has been described in detail with particular reference to certain preferred embodiments thereof, but it will be understood that variations and modifications can be effected within the spirit and scope of the invention.

Parts List

10 first digital imaging device
11 second digital imaging device
12 first scene balance algorithm
13 second scene balance algorithm
14 first color correction transformation
15 second color correction transformation
16 output device
20 first digital imaging device
21 second digital imaging device
22 first color correction transformation
23 second color correction transformation
24 scene balance algorithm
25 output device
30 tonescale curve
40 first digital imaging device
41 second digital imaging device
42 first color transformation
43 second color transformation
44 scene balance algorithm
45 color correction transformation
46 output device
50 digital imaging device
51 low-resolution image determining block
52 color transform application block
53 correction factors determining block
54 scene balance correction factors
55 corresponding correction factors determining block
56 corresponding scene balance correction factors
57 apply corresponding correction factors block
58 color correction block 59 output device
60 linearity LUT
62 color correction matrix
64 XYZ to rgbs matrix
66 nonlinear encoding

We claim:

1. A scene balance correction method for a digital imaging device, comprising:
   a) determining a low-resolution image from an input image in an input color space;
   b) applying a color transformation to convert the low-resolution image to a standard color space to form a standard color space low-resolution image, wherein the standard color space has a defined set of additive RGB primaries having a matrix relationship to CIE XYZ tristimulus values and that are selected so as not to cause any substantial color gamut limitations on the standard color space low-resolution image;
   c) analyzing the standard color space low-resolution image to determine a set of standard color space scene balance correction factors;
   d) determining a set of corresponding input color space scene balance correction factors from the standard color space scene balance correction factors using the color transformation; and
   e) applying the corresponding input color space scene balance correction factors to the input image to form a corrected input image.

2. The method of claim 1 where the digital imaging device is a digital camera.

3. The method of claim 1 where the digital imaging device is a digital scanner.

4. The method of claim 1 where the low-resolution image is determined by averaging blocks of pixels in the input image.

5. The method of claim 1 where dimensions associated with the low-resolution are in the range of 10 to 100.

6. The method of claim 1 where the input color space is a device-dependent color space.

7. The method of claim 6 where the device-dependent color space is an RGB color space.

8. The method of claim 6 where the device-dependent color space corresponds to the color space associated with a digital camera.

9. The method of claim 1 where the color transformation includes applying a color-correction matrix transformation.

10. The method of claim 1 where the color transformation includes applying a three-dimensional look-up table transformation.

11. The method of claim 1 where the analyzing the standard color space low-resolution image block includes a block of determining an overall intensity level correction, and a block of determining a color balance correction.

12. The method of claim 1 where the analyzing the standard color space low-resolution image block includes block of determining a standard color space gray balance point corresponding to a reference gray point.

13. The method of claim 12 where the step of determining a set of corresponding input color space scene balance correction factors includes the step of applying an inverse color transformation to the standard color space gray balance point to determine a corresponding input color space gray balance point.

14. The method of claim 13 where the color transformation includes a color-correction matrix, and the inverse color transformation includes an inverse of the color-correction matrix.

15. The method of claim 1 wherein e) further includes the step of computing a scene balance correction function from the input color space scene balance correction factors.

16. The method of claim 15 where the scene balance correction function is comprised of a set of one-dimensional scene balance correction look-up-tables.

17. A scene balance correction method for a digital imaging device, comprising:
   a) determining a low-resolution image from an input image in an input color space;
   b) applying a color transformation to convert the low-resolution image to a standard color space to form a standard color space low-resolution image, wherein the standard color space has a defined set of RGB primaries that are selected so as not to cause any substantial color gamut limitations on the standard color space low-resolution image;
   c) analyzing the standard color space low-resolution image to determine a set of standard color space scene balance correction factors;
   d) determining a set of corresponding input color space scene balance correction factors from the standard color space scene balance correction factors using the color transformation; and
   e) applying the corresponding input color space scene balance correction factors to the input image to form a corrected input image, where the defined set of RGB primaries have CIE chromaticity values of x=0.8730, y=0.1440 for red, x=0.1750, y=0.9270 for green, and x=0.0850, y=0.0001 for blue.

18. A scene balance correction method for a digital imaging device, comprising the steps of:
   a) determining a low-resolution image from an input image in an input color space having a luminance channel and two color difference channels wherein the luminance channel and 2 color difference channels are computed from logarithms of color values in an RGB color space having a defined set of RGB primaries and the luminance and 2 color difference channels are computed using the following equations $N=(R_{Log}+G_{Log}+B_{Log})/3$ $GM=(2G_{Log}-R_{Log}-B_{Log})/4$ $ILL=(B_{Log}-R_{Log})/2$ $R_{Log}$, $G_{Log}$, and $B_{Log}$ being the logarithms of the color values in the RGB color space and wherein N is a luminance channel; GM is a color difference channel in a green magenta direction; and ILL is another color difference channel that is substantially aligned with the direction in which typical scene illuminants vary;
   b) applying a color transformation to convert the low-resolution image to a standard color space to form a standard color space low-resolution image;
   c) analyzing the standard color space low-resolution image to determine a set of standard color space scene balance correction factors;
   d) determining a set of corresponding input color space scene balance correction factors from the standard color space scene balance correction factors using the color transformation; and
   e) applying the corresponding input color space scene balance correction factors to the input image to form a corrected input image.

19. The method of claim 18 where the defined set of RGB primaries are selected so as not to cause any substantial color gamut limitations on the standard color space low-resolution image.

20. The method of claim 19 where the defined set of RGB primaries have CIE chromaticity values of x=0.8730, y=0.1440 for red, x=0.1750, y=0.9270 for green, and x=0.0.0850, y=0.0.001 for blue.

21. A computer program product comprising a computer readable storage medium having a computer program stored thereon for performing the steps of:

a) determining a low-resolution image from an input image in an input color space;

b) applying a color transformation to convert the low-resolution image to a standard color space to form a standard color space low-resolution image, wherein the standard color space has a defined set of additive RGB primaries having a matrix relationship to CIE XYZ tristimulus values and that are selected so as not to cause any substantial color gamut limitations on the standard color space low-resolution image;

c) analyzing the standard color space low-resolution image to determine a set of standard color space scene balance correction factors;

d) determining a set of corresponding input color space scene balance correction factors from the standard color space scene balance correction factors using the color transformation; and e) applying the corresponding input color space scene balance correction factors to the input image to form a corrected input image.

22. A scene balance correction method for a digital imaging device, comprising:

a) producing a low-resolution image from an input image in an input color space where the low resolution image has a lower resolution that the input image;

b) applying a color transformation to convert the low-resolution image to a standard additive color space to form a standard additive color space low-resolution image, the standard additive color space having additive primaries with no channel crosstalk;

c) analyzing the standard color space low-resolution image to determine a set of standard color space scene balance correction factors;

d) determining a set of corresponding input color space scene balance correction factors from the standard color space scene balance correction factors using the color transformation; and e) applying the corresponding input color space scene balance correction factors to the input image to form a corrected input image.

* * * * *